United States Patent
Tardif et al.

(10) Patent No.: US 9,986,215 B1
(45) Date of Patent: May 29, 2018

(54) LASER SCAN BEAM FOVEATED DISPLAY

(71) Applicant: Microsoft Technology Licensing, LLC, Redmond, WA (US)

(72) Inventors: John Tardif, Sammamish, WA (US); Joshua O. Miller, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

(21) Appl. No.: 15/467,855

(22) Filed: Mar. 23, 2017

(51) Int. Cl.
| | | |
|---|---|---|
| H04N 9/31 | (2006.01) | |
| G02B 27/01 | (2006.01) | |
| G02B 26/08 | (2006.01) | |
| G02B 26/10 | (2006.01) | |

(52) U.S. Cl.
CPC ....... H04N 9/3188 (2013.01); G02B 26/0833 (2013.01); G02B 26/101 (2013.01); G02B 27/0172 (2013.01); H04N 9/3135 (2013.01); H04N 9/3155 (2013.01); G02B 2027/0112 (2013.01); G02B 2027/0125 (2013.01)

(58) Field of Classification Search
CPC .. H04N 9/3188; H04N 9/3155; H04N 9/3135; G02B 26/0833; G02B 26/101; G02B 27/0172; G02B 2027/0112; G02B 2027/0125
USPC ........................................................ 348/745
See application file for complete search history.

(56) References Cited

U.S. PATENT DOCUMENTS

| 7,872,635 B2 | 1/2011 | Mitchell |
|---|---|---|
| 8,493,390 B2 | 7/2013 | Kalinli |
| 8,519,983 B2 | 8/2013 | Sprague et al. |
| 9,071,742 B2 | 6/2015 | Birkbeck et al. |
| 9,380,273 B1 | 6/2016 | Jensen et al. |
| 2005/0195373 A1* | 9/2005 | Feigel ..................... G06F 3/011 353/94 |

(Continued)

FOREIGN PATENT DOCUMENTS

WO  2016113533 A2  7/2016

OTHER PUBLICATIONS

"Foveated Laser Display", http://web.archive.org/web/20141126084301/http://www.kessleroptics.com/portfolio/near-to-eye-displays/foveated-laser-display/, Published on: Nov. 26, 2014, 3 pages.

(Continued)

*Primary Examiner* — Michael Lee
(74) *Attorney, Agent, or Firm* — Singh Law, PLLC; Ranjeev Singh (57) ABSTRACT

An apparatus includes one or more MEMS mirrors, a light source driver and a controller. The light source driver selectively drives one or more light emitting elements of a light source to thereby produce a light beam that is directed towards a same MEMS mirror. The controller controls rotation of the MEMS mirror(s) in a fast-axis direction and a slow-axis direction in order to raster scan an image using the light beam reflected from the MEMS mirror(s). In order to achieve a first line density in a first portion of the image being raster scanned and to achieve a second line density, that is less than the first line density, in a second portion of the image being raster scanned, the controller dynamically adjusts a speed at which one of the MEMS mirror(s) is rotated in the slow-axis direction. Related systems and methods are also disclosed herein.

20 Claims, 8 Drawing Sheets

(56) References Cited

U.S. PATENT DOCUMENTS

| | | | |
|---|---|---|---|
| 2007/0126989 A1* | 6/2007 | Pate | G03B 21/00 353/31 |
| 2008/0144150 A1 | 6/2008 | Champion et al. | |
| 2010/0149073 A1* | 6/2010 | Chaum | G02B 27/0093 345/8 |
| 2012/0105310 A1* | 5/2012 | Sverdrup | G02B 27/017 345/8 |
| 2014/0247277 A1 | 9/2014 | Guenter et al. | |
| 2015/0002940 A1 | 1/2015 | Nister et al. | |
| 2016/0033771 A1 | 2/2016 | Tremblay et al. | |

OTHER PUBLICATIONS

Holmgren, et al., "Scanned Laser Displays for Head Mounted Displays", In Technical Report, TR92-029, Jul. 1, 1992, pp. 1-16.

\* cited by examiner

LASER SCAN BEAM FOVEATED DISPLAY

BACKGROUND

A scanning display device functions by creating "virtual pixels," each of which is a function of the position of a biaxial mirror (or the positions of two uniaxial mirrors) and the magnitude of the signals that drive one or more light emitting elements (e.g., laser diodes) of a light source that produces a light beam that is reflected by the mirror(s). The light emitting element(s) of the light source can be pulsed rapidly to create each pixel in a high resolution display. A substantial portion of display power is consumed in supporting the data bandwidth to process and drive each pixel.

Conventionally, the pixel density of an image produced by a scanning display device is substantially the same throughout the entire raster scanned image. Thus, when there has been a desire to increase a pixel density of an image, conventionally the pixel density of the entire image has been increased, which can increase both processing costs and power consumption costs.

SUMMARY

In accordance with certain embodiments of the present technology, an apparatus (e.g., a scanning display device) includes one or more MEMS mirrors, a light source driver and a controller. The light source driver (e.g., a laser diode driver) is configured to selectively drive one or more light emitting elements (e.g., laser diodes) of a light source to thereby produce a light beam that is directed towards a same MEMS mirror of the one or more MEMS mirrors. The one or more MEMS mirror can be, e.g., a single biaxial MEMS mirror, or two uniaxial MEMS mirrors. The controller is configured to control rotation of the MEMS mirror(s) in a fast-axis direction and a slow-axis direction in order to raster scan an image using the light beam reflected from the MEMS mirror(s). In accordance with certain embodiments, the controller is configured to dynamically adjust a speed at which a MEMS mirror is rotated in the slow-axis direction in order to achieve a first line density in a first portion of the image being raster scanned and to achieve a second line density, that is less than the first line density, in a second portion of the image being raster scanned.

In accordance with certain embodiments, the first portion of the image (having the greater line density) includes a foveal region of the image, and the second portion of the image (having the lower or lesser line density) includes a non-foveal region of the image. A location of the first portion of the image can be fixed relative to a rest of the image. Alternatively, a location of the first portion of the image can be dynamic relative to a rest of the image, e.g., by being based on a gaze of an eye, as determined using an eye tracker. More specifically, an eye tracker can be configured to determine the gaze of an eye, and the controller can be configured to determine the location of the first portion of the image based on the gaze of an eye as determined by the eye tracker.

The apparatus can also include an image processor that is configured to produce pixel data that is provided to the light source driver and used by the light source driver to control timings of when, and magnitudes at which, the one or more light emitting elements of the light source are driven. In accordance with certain embodiments, the image processor produces the pixel data to control the magnitudes at which the one or more light emitting elements of the light source are driven to compensate for how brightnesses of portions of the image are affected by the controller adjusting the speed at which one of the one or more MEMS mirrors are rotated in the slow-axis direction. This is done to ensure that certain portions of the image that have a greater line density are not inappropriately brighter than other portion(s) of the image having a lesser or lower line density. The image processor can also perform foveated rendering, and more specifically, can be configured to produce pixel data that provides for higher image resolution in the first portion of the image being raster scanned than in the second portion of the image being raster scanned.

A method according to an embodiment of the present technology includes selectively driving one or more light emitting elements of a light source to thereby produce a light beam that is directed towards a same MEMS mirror of one or more MEMS mirrors. Such a method also includes controlling rotation of the one or more MEMS mirrors in a fast-axis direction and a slow-axis direction in order to raster scan an image using the light beam reflected from the one or more MEMS mirrors. In accordance with certain embodiments, the controlling includes adjusting a speed at which one of the one or more MEMS mirrors is rotated in the slow-axis direction in order to achieve a first line density in a first portion of the image being raster scanned and to achieve a second line density, that is less than the first line density, in a second portion of the image being raster scanned. In accordance with certain embodiments, the first portion of the image (having the greater line density) includes a foveal region of the image, the second portion of the image (having the lower or lesser line density) includes a non-foveal region of the image. A location of the first portion of the image can be fixed relative to a rest of the image. Alternatively, a location of the first portion of the image can be dynamic relative to a rest of the image, e.g., by being based on a gaze of an eye, as determined using an eye tracking. More specifically, eye tracking can be performed to determine the gaze of an eye, and the location of the first portion of the image can be determined based on the gaze of an eye.

A method can also include producing pixel data that is used to control timings of when, and magnitudes at which, the one or more light emitting elements of the light source are driven, such that the pixel data provides for higher image resolution is the first portion of the image being raster scanned than in the second portion of the image being raster scanned. In certain such embodiments, producing the pixel data includes selecting the magnitudes at which the one or more light emitting elements of the light source are driven to compensate for how brightnesses of portions of the image are affected by adjustments to the speed at which one of the one or more MEMS mirrors are rotated in the slow-axis direction.

Certain embodiments of the present technology are directed to a near eye or heads up display system that includes one or more MEMS mirrors, a light source including one or more light emitting elements, a light source driver and a controller. The light source driver is configured to selectively drive the one or more light emitting elements of the light source to thereby produce a light beam that is directed towards a same MEMS mirror of the one or more MEMS mirrors. The controller is configured to control rotation of the one or more MEMS mirrors in a fast-axis direction and a slow-axis direction in order to raster scan an image using the light beam reflected from the one or more MEMS mirrors.

In accordance with certain embodiments, the near eye or heads up display system also includes one or more optical waveguides each of which includes an input-coupler and an output-coupler. Light corresponding to the image that is raster scanned using the light beam reflected from the MEMS mirror(s), under the control of the controller, is coupled into the one or more optical waveguides via the input-coupler(s) of the one or more optical waveguides. The light corresponding to the image, that is coupled into the one or more optical waveguide(s) via the input-coupler(s), travels at least in part by way of total internal reflection (TIR) from the input-coupler(s) to the output-coupler(s) of the one or more optical waveguide(s). The output-coupler(s) is/are configured to couple light corresponding to the image, that has traveled within the optical waveguide(s) from the input-coupler(s) to the output-coupler (s), out of the optical waveguide(s), so that the image can be viewed by an eye. In accordance with certain embodiments, the controller is configured to dynamically adjust a speed at which one of the one or more MEMS mirrors is rotated in the slow-axis direction in order to achieve a greater line density in a first portion of the image being raster scanned than in a second portion of the image being raster scanned.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
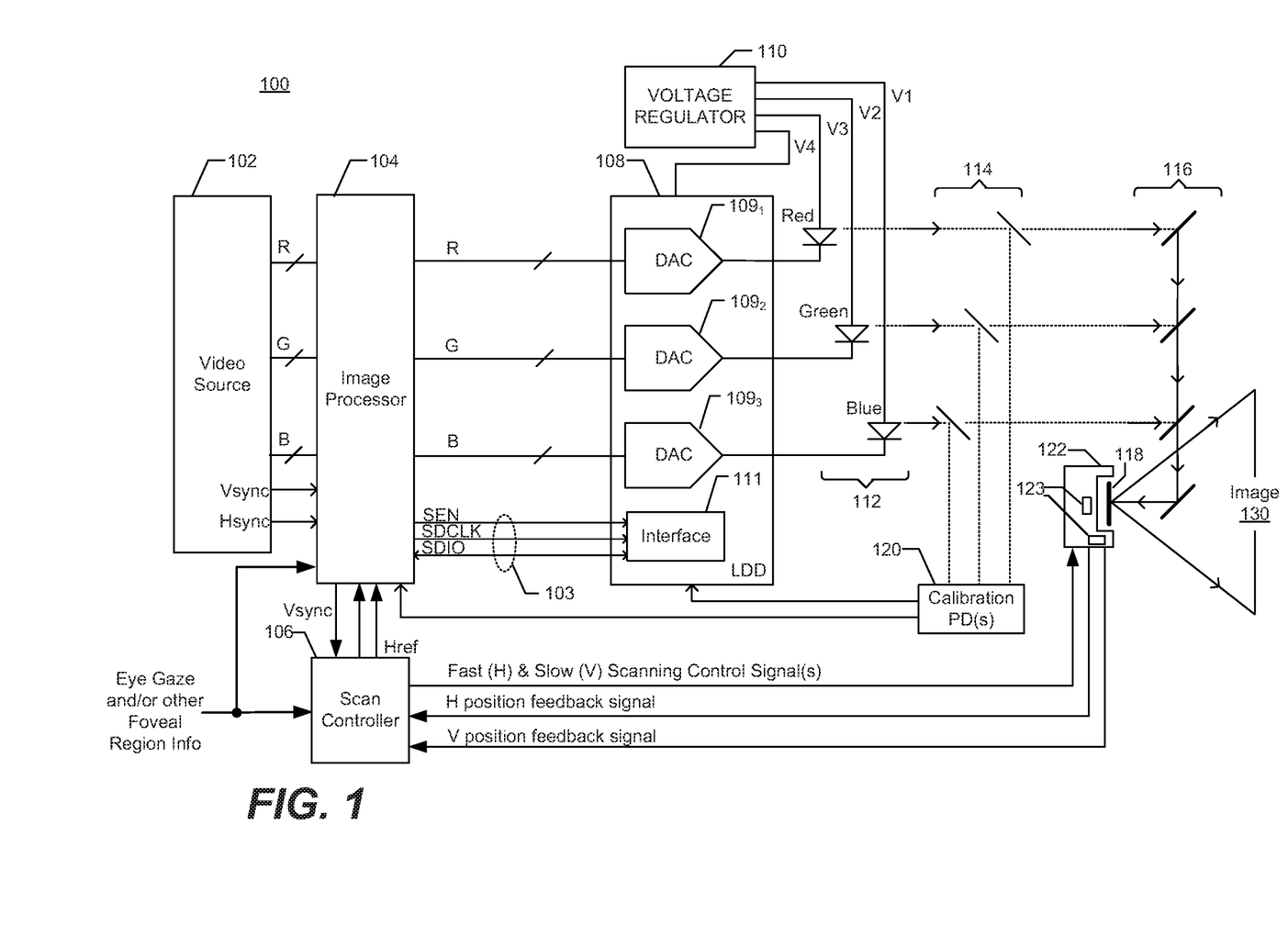
FIG. 1 illustrates a scanning display device, according to an embodiment of the present technology.

FIG. 1 illustrates an exemplary scanning display device 100, according to an embodiment of the present technology. The scanning display device 100, which can also be referred to as a scanning display engine, or more generally a display engine, can be integrated with or attached to a portable device, such as, but not limited to, a mobile phone, a smart phone, a portable computer (e.g., a laptop, netbook or tablet), a personal data assistant (PDA), or a portable media player (e.g., DVD player). The scanning display device 100 can alternatively be integrated with or attached to a non-portable device, such as a desktop computer, a media player (e.g., a DVD player), or an automotive heads up display.

It is also possible that the scanning display device 100 is part of a virtual reality (VR) or augmented reality (AR) head mounted display (HMD) or heads-up display (HUD), and that the scanning display device 100 produces virtual images that are viewable by a wearer of the HMD or observer of the HUD. More specifically, light corresponding to images produced by the scanning display device 100 can be coupled into one or more waveguides, and after travelling through the waveguide(s) by way of total internal reflection (TIR), can be out-coupled from the waveguide(s) so that the light is output and imaged from an output-pupil associated with the waveguide(s). Such AR devices, which can be referred to as see-through, mixed reality display systems, enable a user to see through a transparent or semi-transparent display of a device to view the surrounding environment, and also see images of virtual objects (e.g., text, graphics, video, etc.) that are generated for display to appear as a part of, and/or overlaid upon, the surrounding environment. Other variations are also possible and within the scope of the embodiments of the present technology described herein.

Referring to FIG. 1, the scanning display device 100 is shown as including a video source 102, a image processor 104, a laser diode driver (LDD) 108 and a voltage regulator 110. Depending on the type of video source, a video analog-font-end (AFE) (not shown) can be included between the video source 102 and the image processor 104, and the video AFE may include, e.g., one or more analog-to-digital converters (ADCs). However, a video AFE may not be needed where the video source 102 is a digital video source. The image processor 104 receives red (R), green (G) and blue (B) pixel data (or other color pixel data), a horizontal synchronization (Hsync) signal and a vertical synchronization (Vsync) signal from the video source 102 (or a video AFE). The Hsync signal includes one pulse per horizontal line of a frame, which indicates the end of one line and the beginning of the next line. The Vsync signal includes one pulse per frame, which indicates the end of one frame and the beginning of the next frame. The image processor 104 can also receive information indicative of the position and speed of the mirror(s) 118 from the scan controller 106, or alternatively, directly from the MEMS scanning device 122. The image processor 104 can also receive eye gaze information and/or other information that can be used by the image processor 104 to perform foveated rendering of images. Such eye gaze information can come from an eye tracking device or subsystem that is not specifically shown in FIG. 1.

The image processor 104 can be implemented, e.g., using an application specific integrated circuit (ASIC) and/or a micro-controller. The image processor 104 can perform scaling and/or pre-distortion of the R, G and B pixel data (also referred to simply as RGB pixel data) before such pixel data signals are provided to the LDD 108. Such scaling and/or pre-distortion can include interpolation and/or decimation. More generally, the image processor 104 can perform gamma correction, color space conversion, interpolation and/or decimation. The interpolation and/or decimation can be performed to map the input RGB pixel data (received from the video source 102, or an AFE) to the output RGB pixel data that is provided to the LDD 108, by taking into account the actual scanning trajectory and the actual position of the scanning mirror(s) 118. The processing of the RGB pixel data (including the interpolation and/or decimation) can differ based on whether an odd frame or an even frame is being processed, and/or based on other factors. The image processor can also perform foveated rendering.

The image processor 104 communicates with a scanning controller 106, which can also be referred to as scanning mico-mirror(s) controller 106, microelectromechanical systems (MEMS) controller, or a MEMS driver. The scanning controller 106 can produce a horizontal scanning control signal (H scanning control signal) and a vertical scanning control signal (V scanning control signal), which are used to control the scanning of one or more micro-mirror(s) 118, which can be MEMS mirror(s). Where a single biaxial scanning mirror 118 is used, the H and V scanning control signals are combined into a combined H and V scanning control signal, which can also be referred to as a composite H and V scanning control signal, or the scanning controller 106 produces a combined H and V scanning control signal. Where two uniaxial scanning mirrors 118 are used, the H and V scanning control signals are not combined. The combined H and V scanning control signal (or separate H and V scanning control signals) are provided to a MEMS scanning device 122 to control the scanning mirror(s) 118. Additional details of signals or waveforms produced by the scanning controller 106, according to specific embodiments, are discussed below. While shown as two separate blocks in FIG. 1, it is also within the scope of an embodiment to combine the image processor 104 and the scanning controller 106 into one functional block or circuit.

Typically, horizontal scanning occurs much faster than vertical scanning, and thus, horizontal scanning is sometimes referred to as scanning in a fast-axis direction, and vertical scanning is sometimes referred to as scanning in a slow-axis direction. Where horizontal scanning is faster than vertical scanning, as is typically the case, the H scan control signal can also be referred to as a fast scan control signal or waveform, and the V scan control signal can also be referred to as the slow scan control signal or waveform. Where a biaxial scanning mirror is being used, the same mirror is rotated in both a fast-axis direction and a slow-axis direction. Where two uniaxial scanning mirrors are being used, one of the mirrors is rotated in the fast-axis direction, and the other one of the mirrors is rotated in the slow-axis direction.

Still referring to FIG. 1, the voltage regulator 110 (e.g., a quad-output adjustable DC-DC buck-boost regulator) can convert a voltage provided by a voltage source (e.g., a battery or AC supply) into the various voltage levels (e.g., four voltage levels V1, V2, V3 and V4) for powering the various components of the scanning display device 100. The LDD 108 is shown as including three digital-to-analog converts (DACs) $109_1$, $109_2$ and $109_3$ (which can be collectively referred to as DACs 109). The LDD is also shown as including a serial interface 111 which may receive, via a serial bus 103, a serial enable (SEN) signal and a serial data clock signal (SDCLK) from a serial interface of the image processor 104. Additionally, a bi-directional serial data input/output (SDIO) line of the serial bus 103 allows the image processor 104 to write data to and read data from registers within the LDD 108. Alternative serial buses and interfaces can be used, such as, but not limited to, an Inter-Integrated Circuit (I2C) or a Serial Peripheral Interface (SPI) bus and interface. The LDD 108 also includes registers, and the like, which are not shown.

The DACs 109 of the LDD 108 drive laser diodes 112, which can include, e.g., a red, a green and a blue laser diode, but are not limited thereto. Where the LDD 108 is used to drive a red (R), a green (G) and a blue (B) laser diode, the LDD can be referred to as a RGB triple laser diode driver. It is possible that alternative types of light emitting elements may be used in place of laser diodes, such as, but not limited to, one or more light emitting diode (LEDs), super luminescent light emitting diodes (SLEDs), or a quantum dot light emitting diodes (QD-LED). Accordingly, as the term is used herein, a laser diode driver (LDD), unless stated otherwise, can drive light emitting elements including, but not limited to, laser diodes (e.g., the LDD may alternatively drive LEDs).

The light produced by the laser diodes 112 or other light emitting elements can be provided to beam splitters 114, which can direct a small percentage of the light toward one or more calibration photo-detectors (PDs) 120, and direct the remainder of the light toward combiner optics 116, which can include dichroic lenses, dichroic mirrors, reflection plates and/or the like, which combine the R, G and B light (and/or light of one or more other wavelengths) into a single light beam. Each light source 112 can also including collimating optics. The light output by the optics 116 can be provided to one or more scanning micro mirror(s) 118, also known as MEMS mirror(s), that is/are maneuvered (e.g., rotated) by the scanning device 122. The laser diodes 112 or other light emitting elements and the one or more elements (e.g., combiner optics and collimating optics) that combine the red, green and blue light (and/or light of other wavelengths) into a light beam can be referred to herein, collectively, as a light source that produces a light beam. Where the display is monochrome, the light source can include a single light emitting element, or multiple light emitting elements that produce light of the same wavelength.

The scan controller 106 can control the scan device 122 to maneuver the mirror(s) 118 to raster-scan reflected light onto a surface, e.g., a screen, a wall, the back of a chair, etc., to thereby form an image 130. Alternatively, the raster-scanned reflected light can be coupled into input-coupler(s) of one or more waveguides of an HMD or HUD, and the waveguides can guide the light to output-coupler(s) that out-couple the light, as will be described below with reference to FIG. 5. Other variations are also possible.

The mirror(s) 118 can be implemented, for example, using a single scanning mirror (which is often referred to as a biaxial mirror) or using two uniaxial scanning mirrors, as noted above. The scanning device 122 can include horizontal and vertical position sensors 123 (e.g., Piezo-resistive sensors) that provide one or more position feedback signal(s) indicative of the position of the mirror(s) 118 to the scanning controller 106, to provide real time position information to the scanning controller 106. It is also possible that the position sensors 123 are separate from the scanning device 122. The position sensors 123 can sense the angle of rotation of the mirror(s) 118 along the H and V scan directions, or more generally, along the fast-axis and slow-axis scan directions. In certain embodiments, the scanning device 122 uses moving-coil actuation with a single drive coil (also referred to as an actuator coil) to maneuver a single biaxial scanning mirror 118. Alternatively, the scanning device 122 can maneuver two uniaxial scanning mirrors using two drive coils. The scanning device 122 can also be referred to as a MEMS device, the scanning mirror(s) 118 can also be referred to as MEMS scanning mirror(s), and the MEMS device 122 and the scanning mirror(s) 118 can collectively be referred to as a MEMS scanning mirror assembly, or simply a MEMS scanner.

A scanning display device, such as the device 100 described with reference to FIG. 1, functions by creating "virtual pixels," which will be referred to hereafter more succinctly as pixels. Each pixel is a function of the position of a biaxial mirror (or the positions of two uniaxial mirrors)

and the magnitude (amplitude and/or pulse width) of the signals that drive one or more light emitting elements (e.g., laser diodes 112) of a light source that produces a light beam that is reflected by the mirror(s) 118. The light emitting element(s) of the light source can be pulsed rapidly to create each pixel in a high resolution display. A substantial portion of display power is consumed in supporting the data bandwidth to process and drive each pixel.

Pixel density, as the term is used herein, refers to the number of pixels per unit of space, which can be either angular space or projection space. Conventionally, the pixel density of an image produced by a scanning display device is substantially the same throughout the entire image. Thus, when there has been a desire to increase a pixel density of an image, conventionally the pixel density of the entire image has been increased. This can increase both processing costs and power consumption costs, which are at least partially interrelated. For example, if a pixel count is to be increased by ~50%, e.g., from 600×600 pixels (i.e., 360,000 pixels) to 735×735 pixels (i.e., 540,225 pixels), then an image processor (e.g., 104 in FIG. 1) needs to render approximately 180,000 additional pixels per frame, which increases the amount of power consumption associated with rendering pixels. Additionally, this can also increase the amount of power consumed to display the pixels, since the number of pixels being displayed is increased by ~50%.

In order to reduce the amount of time and power necessary to render pixel data for a frame of an image, foveated rendering can be performed, which takes advantage of the fact that that the resolution of the human eye is highest in the fovea (the central vision area) and lower in peripheral areas, which can also be referred to as non-foveal areas. As a result, if a device uses an eye tracker to detect a gaze direction of a user's eye, computational load can be reduced by rendering an image that has higher resolution at the direction of gaze and lower resolution elsewhere. The portion of an image that has the higher resolution can be referred to as the foveal region, and the portion of the image that has the lower resolution can be referred to as the non-foveal region. The resolution in the entire non-foveal region can be the same. Alternatively, a non-foveal regions can be subdivided into two or more regions, each having a different resolution. In accordance with certain embodiments, the location of the foveal region can be fixed, e.g., it can be assumed that a user's eye is gazing at the center (or some other portion) of an image and the foveal regions can be the center (or some other portion) of the image. In accordance with alternative embodiments, the location of the foveal region can be dynamically adjusted, e.g., based on a direction of gaze of a user's eye as determined by an eye tracker. Another possibility would be to move the foveated region to a location of interest, e.g., in order to direct a user's gaze toward the location of interest. Other variations are also possible.

When foveated rending is performed to reduce a computational load associated with rendering, the same number of pixels are still typically displayed. In other words, even where pixels are rendered in a foveated manner, the display itself does not typically adjust the number of pixels displayed. Rather, a group or block of adjacent displayed pixels (e.g., a 3×3 group of pixels) located within a non-foveal portion of an image may all be identical. As a result, the same number of pixels are displayed, and thus the power consumed to display the pixels of the image is typically the same whether or not foveated rendering was performed. Certain embodiments of the present technology, which are explained below, display less pixels within a non-foveal region than in a foveal region, which can reduce the amount of power consumption associated with displaying an image. However, before going into details of such embodiments, it is first useful to provide additional details of how a scanning display device conventionally operates. This way, distinctions between the embodiments of the present technology and conventional scanning display technology can be better appreciated.

Figure 2A:
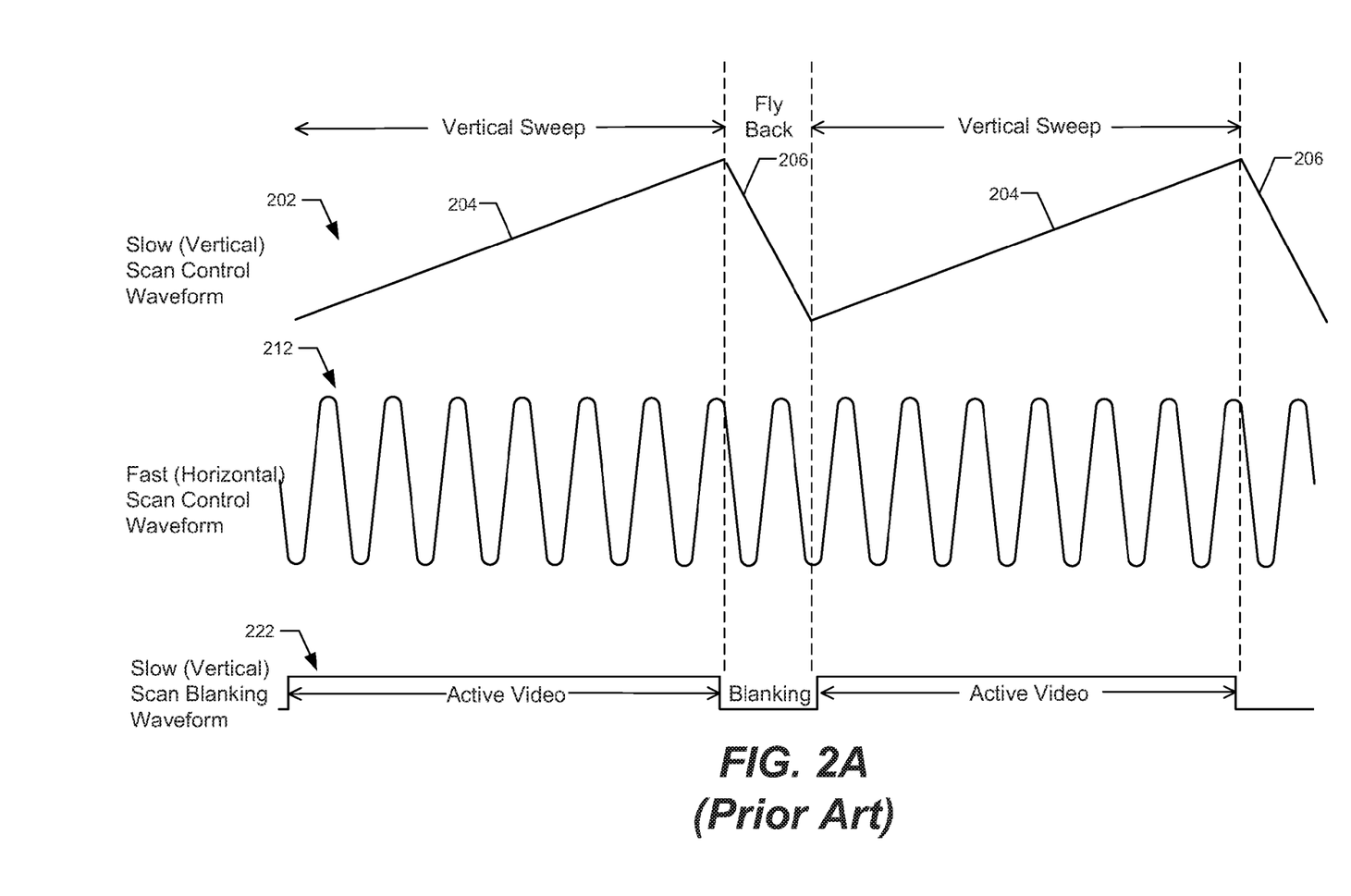
FIG. 2A shows conventional slow and fast scan control waveforms.
Figure 2B:
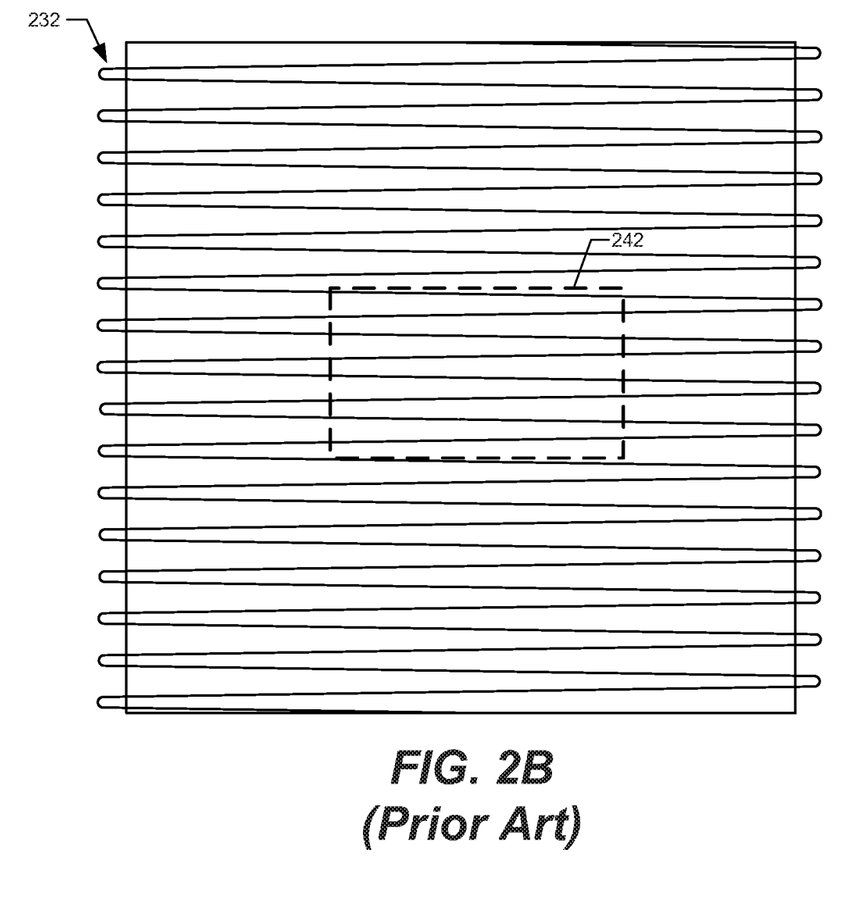
FIG. 2B shows a conventional scan trajectory, in angle space, that can be achieved using the conventional slow and fast scan control waveforms shown in FIG. 2A.

FIG. 2A shows conventional slow and fast scan control waveforms 202 and 212, which can also be referred to as beam deflection waveforms. FIG. 2B shows a conventional scan trajectory 232, in angle space, that is achieved using the conventional slow and fast scan control waveforms 202 and 212 shown in FIG. 2A. Still referring to FIG. 2B, the scan trajectory 232 has a sinusoidal component on the fast-scan axis (horizontal axis) and a sawtooth component on the slow-scan axis (vertical axis). In such a scan trajectory 232, the beam sweeps back and forth left-to-right and right-to-left in a sinusoidal pattern, and sweeps vertically (top-to-bottom) in a sawtooth pattern with the display blanked during flyback (bottom-to-top).

Referring to again to FIG. 2A, the slow scan control waveform 202 is shown as being a sawtooth waveform, and the fast scan control waveform 212 is shown as being a sinusoidal waveform. The sawtooth slow scan control waveform 202 includes rising portions 204 corresponding to vertical sweeps from top-to-bottom, and also includes falling portions 206 corresponding to the flybacks from bottom-to-top. After the flyback, the vertical sweep traverses substantially the same path on each trajectory. The slope of the vertical sweep portion of the slow scan control waveform 202 is constant, meaning there is a constant speed at which a MEMS mirror is rotated in angular space about the slow-axis when an image is being raster scanned. In other words, because the slope of the slow scan control waveform 202 is constant, it causes a mirror to rotate in the slow-axis direction at a constant speed with zero acceleration. If raster scanning is performed from bottom-to-top (instead of from top-to-bottom), then the slow scan control waveform would be inverted compared to what is shown in FIG. 2A.

The sinusoidal fast scan control waveform 212, which causes harmonic oscillating of a MEMS scanning mirror, can be used to provide a master clock for the scanning display device. The timing of the slow scan control waveform 202, as well as the timing of a control loop, can be derived from the timing of the sinusoidal fast scan control waveform 212.

A vertical blanking waveform 222 is also shown in FIG. 2A. The vertical blanking waveform 222 causes the scanned beam to be blanked (no pixels are displayed) during flyback, and not to be blanked during the vertical sweep. While not shown in FIG. 2A, there can also be a horizontal blanking waveform that causes the scanned beam to be blanked near the edges of the horizontal sweeps, which corresponds to when the rotation of a mirror slows down, momentarily comes to a stop, changes direction, and then speeds up. The waveforms 202, 212 and 222 (and other waveforms shown and described herein) are not necessarily be drawn to scale. For example, in an actual implementation there would be many more inflections in each portion of the sinusoidal fast scan waveform 212 corresponding to a vertical sweep, and the relative magnitudes of the various waveforms are not necessarily drawn to scale.

Referring again to FIG. 2B, the scan trajectory shown therein is represented in angle space, as opposed to projected space. One of ordinary skill in the art would understand that if the scan trajectory were translated from angle space to projected space, the line spacing may be slightly wider (and thus the line density may be slightly lower) at the upper and lower portions of a projected image due to the reflected scanned beam being more oblique at the upper and lower portions of the projected image than at the center of the image. Nevertheless, for the purpose of this description it will be assumed that when the slow scan control signal has a constant slope, as shown in FIG. 2A, that the resulting line spacing (and thus, the resulting line density) is substantially constant throughout a resulting image.

As explained above, when an image is produced using the scan trajectory shown in FIG. 2B, the line density is the same throughout the entire frame of the image being scanned. Accordingly, if it is assumed that the dashed block labeled 242 in FIG. 2B corresponds to a foveal region, and outside the dashed block labeled 242 corresponds to a non-foveal region, the line density is the same within the portion of the image corresponding to the foveal region as it is within the portion of the image corresponding to the non-foveal region. Stated another way, when producing an image using the scan trajectory shown in FIG. 2B, the line density will be the same within a foveated region 242 of the image and a non-foveated region of the image.

Referring briefly back to FIG. 1, in accordance with certain embodiments of the present technology, the scan controller 106 dynamically adjusts a speed at which one of the MEMS mirror(s) 118 is rotated in the slow-axis direction, in order to achieve a first line density in a first portion of the image being raster scanned, and to achieve a second line density, that is less than the first line density, in a second portion of the image being raster scanned. In other words, the scan controller 106 causes raster scanning that purposely produces a greater line density in a first portion of an image than in a second portion of an image.

In accordance with certain embodiments, the first portion of the image (which has the greater line density) includes a foveal region of an image, and the second portion of the image (which has the lower line density) includes a non-foveal region of the image. In certain such embodiments, a location of the first portion of the image (which includes the foveal region and has the greater line density) is fixed relative to a rest of the image (which has the lower line density). For example, it can be assumed that the foveal region, which is included within the first portion of the image (which has the greater line density) is within the center, or some other location, of the image. In accordance with other embodiments, a location of the first portion of the image (which includes the foveal region and has the greater line density) is dynamic relative to a rest of the image (which has the lower line density). For example, eye tracking can be used to detect where a user's eye is gazing, and the first portion of the image (which includes the foveal region has the greater line density) can be positioned to be centered about the location where the user's eye is gazing. Other variations are also possible, and within the scope of the embodiments described herein.

In order to produce a greater line density within a first portion of an image, relative to the rest of the image, rotation of the MEMS mirror in the slow-axis direction (which is likely the vertical direction) is purposely slowed down when the first portion of the image is being scanned relative to the speed at which the rest of the image is being scanned. This can be achieved by reducing the slope of the portion of the slow scan control waveform that is being used to raster scan the first portion of the image, compared to the slope of the slow scan control waveform that is used to raster scan the rest of the image. An example of this is shown in FIG. 3A.

Figure 3A:
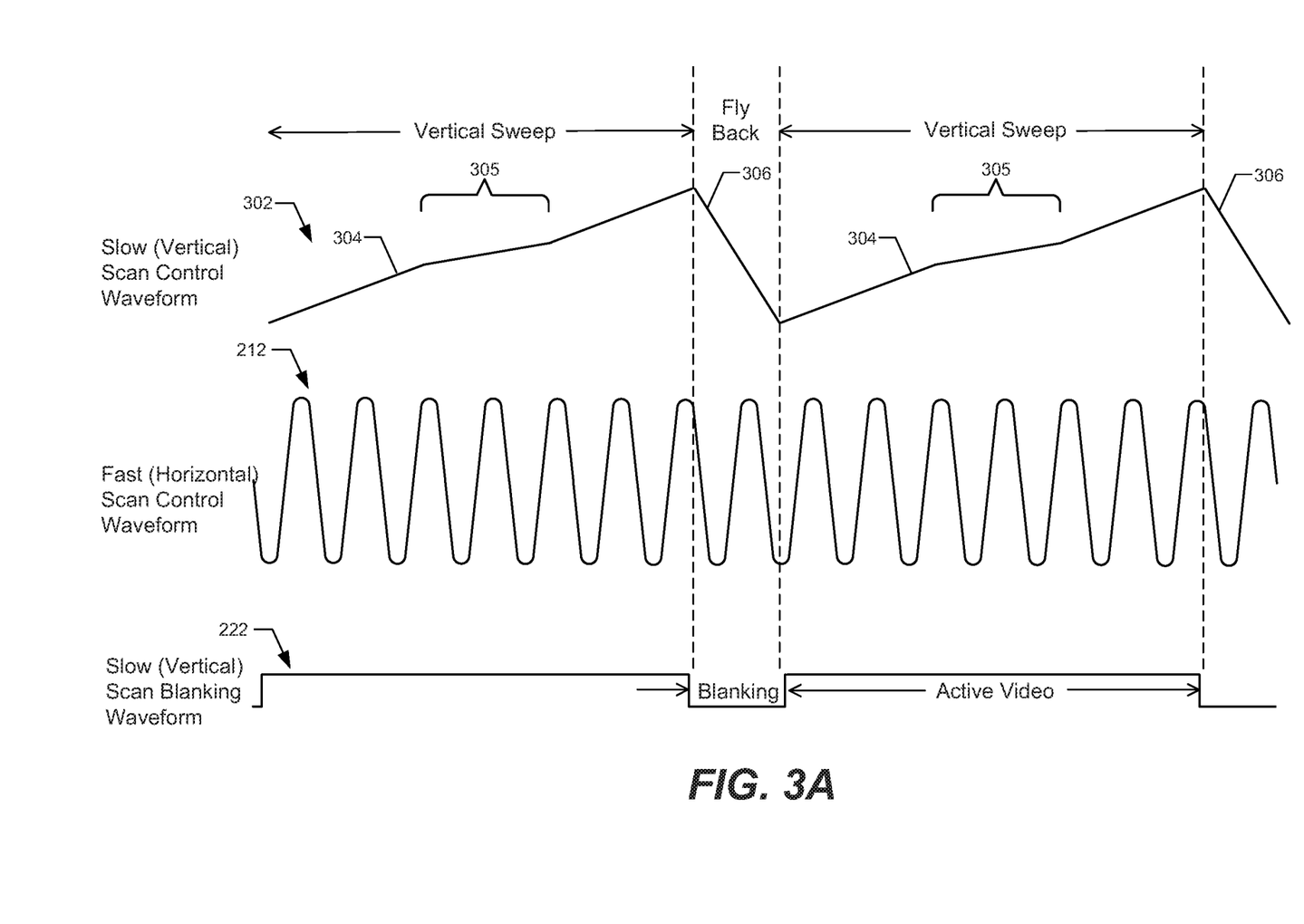
FIG. 3A shows slow and fast scan control waveforms, according to an embodiment of the present technology, wherein the slow scan control waveform has piece-wise linear portions that include different slopes.

Referring to FIG. 3A, shown therein is a slow scan control waveform 302 having rising portions 304 (corresponding to vertical sweep portions) that do not have a constant slope, meaning there is a non-constant speed at which a MEMS mirror is rotated in angular space about the slow-axis when an image is being raster scanned. The falling portions 306 that correspond to the flyback from bottom-to-top are substantially the same as the falling portions 206 of the slow scan control waveform 202 in FIG. 2A. The fast scan control waveform 212 and the vertical scan blanking waveform shown in FIG. 3A are labeled the same and are the same as in FIG. 2A, and thus, need not be described again.

The slow scan control waveform 302 in FIG. 3A, in contrast to the slow scan control waveform 202 shown in and discussed with reference to FIG. 2A, has more than one slope, which causes the slow (e.g., vertical) rotation of a scanning mirror to vary in speed during each slow (e.g., vertical) sweep that is used to raster scan an image, and more specifically, a frame thereof. Still referring to the slow scan control waveform 302, because the slope of the slow scan control waveform 302 is not constant, it causes a scanning mirror to rotate in the slow-axis direction at different speeds with varying acceleration. More specifically, the slope of the rising portions 304 of the slow scan control waveform 302 is lower (i.e., less steep) within the segments labeled 305 than in the other segments of the rising portions 304 of the waveform 302 that correspond to the sweep of trajectory from top-to-bottom.

Since the slope is proportional to the speed at which a scanning mirror is rotated about the slow-axis, the scanning mirror will be rotated more slowly when controlled using the segments 305 of the slow scan control waveform 302 compared to when the scanning mirror is being rotated using the other segments of the rising portion 304 of the slow scan control waveform 302 having a greater (i.e., steeper) slope. As will be appreciated from FIG. 3B, described below, this will result in a greater line density in the portion of an image being scanned using the lower slope segments 305 than in other portions of the image being scanned using the higher slope segments of the slow scan control waveform 302. For an example, if the slope of the segments 305 is half the slope of the other segments of the vertical sweep portion of the slow scan control signal 302, then the line density will be doubled in the portion of the an image being scanned using the lower slope segments 305 than in other portions of the image being scanned using the higher slope segments of the slow scan control waveform 302. If raster scanning is performed from bottom-to-top (instead of from top-to-bottom), then the slow scan control waveform 302 would be inverted compared to what is shown in FIG. 3A.

Figure 3B:
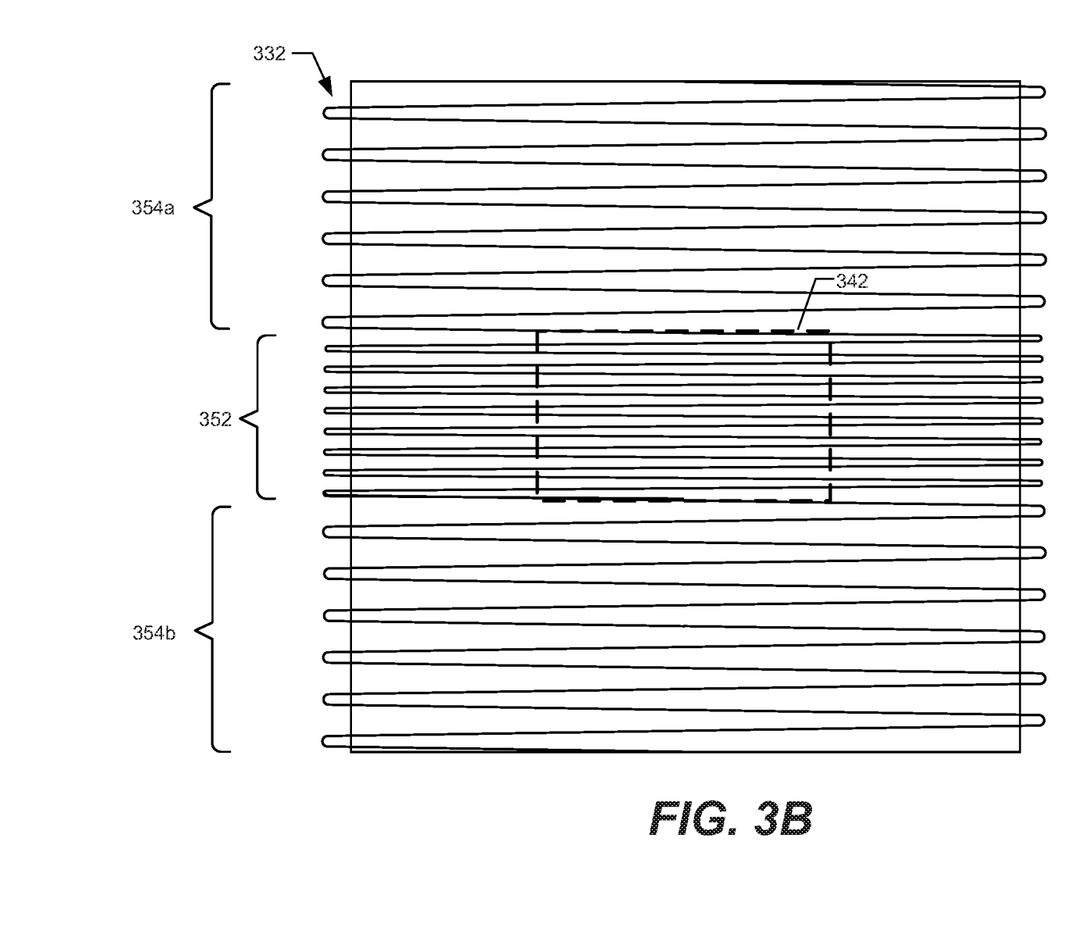
FIG. 3B shows a scan trajectory, in angle space, that is achieved using the slow and fast scan control waveforms shown in FIG. 3A, in accordance with an embodiment of the present technology.

FIG. 3B shows a scan trajectory 332, in angle space, that is achieved using the slow and fast scan control waveforms 302 and 212 shown in FIG. 3A. The scan trajectory has a sinusoidal component on the fast-scan axis (horizontal axis) and a generally sawtooth component on the slow-scan axis (vertical axis). In contrast to the scan trajectory 232 shown in FIG. 2B, which has substantially the same line density throughout an entire image being raster scanned, the scan trajectory 332 (and thus the raster scanned image) has a greater line density within the portion 352 of the image, than in the other portions of the image 362 (which in this example, includes two non-contiguous portions 354a and 354b, that can collectively be referred to as the portion 354). If it is assumed that the dashed block labeled 342 in FIG. 3B corresponds to a foveal region, and outside the dashed block labeled 342 corresponds to a non-foveal region, then it can be appreciated that the portion 352 that includes the greater line density includes the foveal region 342, and the portion 354 includes the non-foveal region. In this example, since the foveal region 342 does not extend the entire width of the image, the portion 352 also includes (i.e., to the left and right of the dashed block 342) some of the non-foveal region.

Referring again to FIG. 3A, each of the rising portions 304 (corresponding to vertical sweeps from top-to-bottom) of the slow scan control waveform 302 is shown as being a piece-wise linear signal that has two different slopes. This causes raster scanning about the slow-axis to occur at two different speeds during each sweep about the slow-axis. In alternative embodiments, each vertical sweep portion of a slow scan control waveform can be a piece-wise linear signal that has more than two different slopes (i.e., three or more different slopes), which would cause raster scanning about the slow-axis to occur at more than two different speeds (i.e., three or more different speeds) during each rotation about the slow-axis. This can be used to achieve more than two (i.e., three or more) different line densities within an image, and more specifically, frames thereof In alternative embodiments, rather than being a piece-wise linear signal that has two or more different slopes, each of the rising portions (corresponding to vertical sweeps from top-to-bottom) of the slow scan control waveform can be a non-linear signal that causes raster scanning about the slow-axis to occur at numerous continually changing different speeds. For an example, each of the rising portions (corresponding to vertical sweeps from top-to-bottom) of the slow scan control waveform can be generally sinusoidal, as shown, for example, in FIG. 4. More specifically, referring to FIG. 4, the rising portions 404 (corresponding to vertical sweeps from top-to-bottom) of the slow scan control waveform 402, which is shown as being generally sinusoidal, has relatively steep slopes near the beginning and end of each rising portion 404, and has its shallowest slope near the middle of each rising portion 404. This will result in the fastest scanning about the slow scan axis (and thus, the lowest line density) near the top and bottom of each image (and more specifically, a frame thereof) and the slowest scanning about the slow scan axis (and thus, the highest line density) near the middle of each image, assuming the slow-axis is the vertical axis.

As noted above, the scanning display device 100, which can also be referred to as a scanning display engine, or more generally a display engine, can be integrated with or attached to a portable device, such as, but not limited to, a mobile phone, a smart phone, a portable computer (e.g., a laptop, netbook or tablet), a PDA, or a portable media player (e.g., DVD player). As also noted above, the scanning display device 100 can alternatively be integrated with or attached to a non-portable device, such as a desktop computer, a media player or an automotive heads up display. It is also possible that the scanning display device 100 is part of a VR or AR HMD or HUD, and that the scanning display device 100 produces virtual images that are viewable by a wearer of the HMD or observer of the HUD. The images produced by the scanning display device 100 can be projected onto a screen or other surface. Alternatively, light corresponding to images produced by the scanning display device 100 can be coupled into one or more waveguides, and after travelling through the waveguide(s) by way of total internal reflection (TIR), can be out-coupled from the waveguide(s) so that the light is output and imaged from an output-pupil associated with the waveguide(s), e.g., as shown in and described with reference to FIG. 5.

Figure 5:
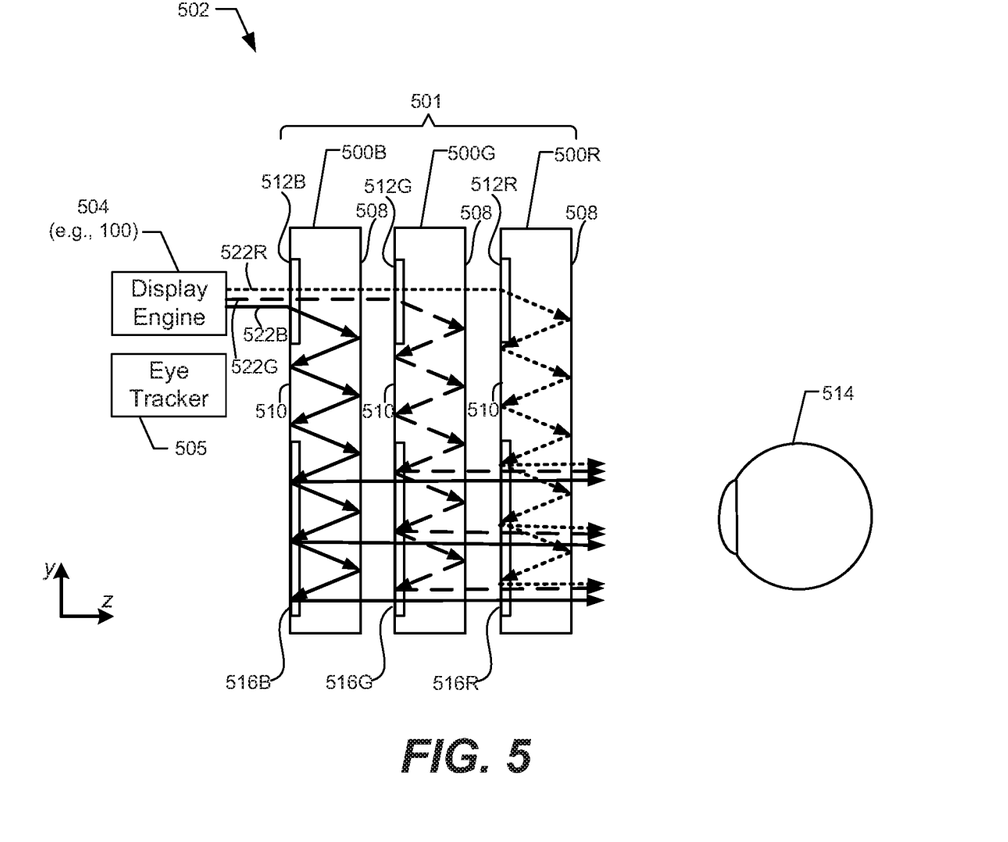
FIG. 5 is a side view of an exemplary display system, according to an embodiment of the present technology.

FIG. 5 is a side view of an exemplary display system 502, according to an embodiment of the present technology. The display system 502 is shown as including three optical waveguides labeled 500R, 500G, 500B and a display engine 504 that generates an image including angular content that is coupled into the waveguides 500R, 500G and 500B by respective input-couplers 512R, 512G and 512B. FIG. 5 also shows a human eye 514 that is viewing the image (as a virtual image) within an eye box that is proximate output-couplers 116R, 116G and 116B. Explained another way, the human eye 514 is viewing the image from an output-pupil associated with the waveguides 500R, 500G and 500B. The display system 502 can be, e.g., a near eye display (NED) or a heads up display (HUD) system, but is not limited thereto.

The optical waveguides 500R, 500G and 500B can be configured, respectively, to transfer red, green and blue light corresponding to an image from an input-pupil to an output-pupil. More specifically, an input-coupler 512R of the waveguide 500R can be configured to couple light (corresponding to a scanned image) within a red wavelength range into the waveguide 500R, and the output-coupler 516R of the waveguide 500R can be configured to couple light (corresponding to the image) within the red wavelength range (which has travelled from the input-coupler 512R to the output-coupler 516R by way of TIR) out of the waveguide 500R. Similarly, an input-coupler 512G of the waveguide 500G can be configured to couple light (corresponding to the scanned image) within a green wavelength range into the waveguide 500G, and the output-coupler 516G of the waveguide 500G can be configured to couple light (corresponding to the image) within the green wavelength range (which has travelled from the input-coupler 512G to the output-coupler 516G by way of TIR) out of the waveguide 500G. Further, an input-coupler 512B of the waveguide 500B can be configured to couple light (corresponding to the scanned image) within a blue wavelength range into the waveguide 500B, and the output-coupler 516B of the waveguide 500B can be configured to couple light (corresponding to the image) within the blue wavelength range (which has travelled from the input-coupler 512B to the output-coupler 516B by way of TIR) out of the waveguide 500B. In accordance with an embodiment, the red wavelength range is from 600 nm to 650 nm, the green wavelength range is from 500 nm to 550 nm, and the blue wavelength range is from 430 nm to 480 nn. Other wavelength ranges are also possible.

The optical waveguides 500R, 500G and 500B can be referred to collectively as the waveguides 500, or individually as a waveguide 500. Two or more of the waveguides 500 can be referred to as a waveguide assembly 501. More specifically, multiple waveguides 500 can be stacked, back-to-back, to provide the waveguide assembly 501. The distance between adjacent waveguides 500 of the waveguide assembly 501 can be, e.g., between approximately 50 micrometers (μm) and 300 μm, but is not limited thereto. While not specifically shown, spacers can be located between adjacent waveguides 500 to maintain a desired spacing therebetween. The input-couplers 512G, 512R and 512B can be referred to collectively as the input-couplers 512, or individually as an input-coupler 512. Similarly, the output-couplers 516G, 516R and 516B can be referred to collectively as the output-couplers 516, or individually as an output-coupler 516. While the waveguide assembly 501 is shown as including three waveguides 500, it is also possible that a waveguide assembly include more or less than three waveguides Each of the input-couplers 512 have an input angular range, and each of the output-coupler 516 have an output angular range. In accordance with certain embodiments, all of the input-couplers 512 have substantially the same input angular range, and all of the output-couplers 516 have substantially the same output angular range. In accordance with certain embodiments, the input angular range for the input-couplers 512 is substantially the same as the output angular range for the output-couplers 516. Values are considered to be substantially the same if they are within 5% of one another. In accordance with certain embodiments, the input angular range and the output angular range are each approximately +/−15 degrees relative to the normal. Smaller or larger input and output angular ranges are also possible, and within the scope of embodiments described herein.

In FIG. 5, the dotted arrowed line 522R is representative of red (R) light corresponding to an image that is output by the display engine 504, the dashed arrowed line 522G is representative of green (G) light corresponding to the image that is output by the display engine 504, and the solid arrowed line 522B is representative of blue (B) light corresponding to the image that is output by the display engine 504. While the R, G and B light (522R, 522G and 52B) is shown as being spatially offset from one another, this is likely not the case, but rather, FIG. 5 was drawn in this manner so that the R, G and B light can be separately represented. More likely, the R, G and B light (522R, 522G and 52B) that exits the display engine 504 would completely overlap one another. Further, while the waveguides 500R, 500G and 500B are shown as being stacked in a specific order, the order in which the waveguides 500 are stacked can be changed.

In accordance with specific embodiments, the display engine 504 is implemented using the scanning display device 100 described above with reference to FIG. 1, or a similar scanning display device. In FIG. 5, the display engine 504 is shown as facing back-side surfaces 510 of the waveguides 500, and the eye 514 is shown as facing front-side surfaces 508 opposite and parallel to the back-side surfaces 510. This provides for a periscope type of configuration in which light enters the waveguide on first sides of the waveguides 500, and exits the waveguides 500 at an opposite sides of the waveguides 500. Alternatively, the input-couplers 512 and the output-couplers 516 can be implemented in a manner such that the display engine 504 and the eye 514 are proximate to and face a same major planar surface (508 or 510).

The waveguide assembly 501 can be incorporated into a see-through mixed reality display device system, but is not limited to use therewith. A separate instance of the waveguide assembly 501 and the display engine 504 can be provided for each of the left and right eyes of a user. In certain embodiments, such waveguide assemblies 501 may be positioned next to or between see-through lenses, which may be standard lenses used in eye glasses and can be made to any prescription (including no prescription). Where a see-through mixed reality display device system is implemented as head-mounted display (HMD) glasses including a frame, the display engine 504 can be located to the side of the frame so that it sits near to a user's temple. Alternatively, the display engine 504 can be located in a central portion of the HMD glasses that rests above a nose bridge of a user. Other locations for the display engine 504 are also possible. In these instances, the user can also be referred to as a wearer. Where there is a separate waveguide assembly for each of the left and right eyes of a user, there can be a separate display engine 504 for each of the waveguide assemblies, and thus, for each of the left and right eyes of the user. One or more further adjacent waveguides can be used to perform eye tracking based on infrared light that is incident on and reflected from the user's eye(s) 514, as is known in the art.

Block 505 in FIG. 5 is representative of an eye tracker that can be used to track the gaze of an eye. The eye tracker 505 can utilize one or more further adjacent waveguides to perform eye tracking based on infrared light that is incident on and reflected from the user's eye(s) 514, as noted above, as is known in the art. It is also possible that the eye tracker 505 not utilize any waveguides, as is also known in the art. Rather, they eye tracker 505 can direct light directly into the eye 514 and detect direct reflections therefrom. The eye tracker 505 can include, e.g., a light source that emits infrared light (or light of another wavelength), and a light sensor or camera that produces eye tracking data, as is known in the art. The eye tracker 505 can detect infrared light (or, light of another wavelength) reflected from the eye 514 and sensed by a video camera or some other specially designed optical sensor. The information is then analyzed to extract eye rotation from changes in reflections. Video-based eye trackers typically use the corneal reflection (also known as the first Purkinje image) and the center of the pupil as features to track over time. For another example, a dual-Purkinje type of eye tracker can use reflections from a front of the cornea (also known as the first Purkinje image) and the back of the lens (also known as the fourth Purkinje image) as features to track. The eye tracker 505 can alternatively image features from inside the eye, such as the retinal blood vessels, and follow these features as the eye rotates. The use and inclusion of other types of eye trackers is also within the scope of the embodiments described herein.

Figure 6:
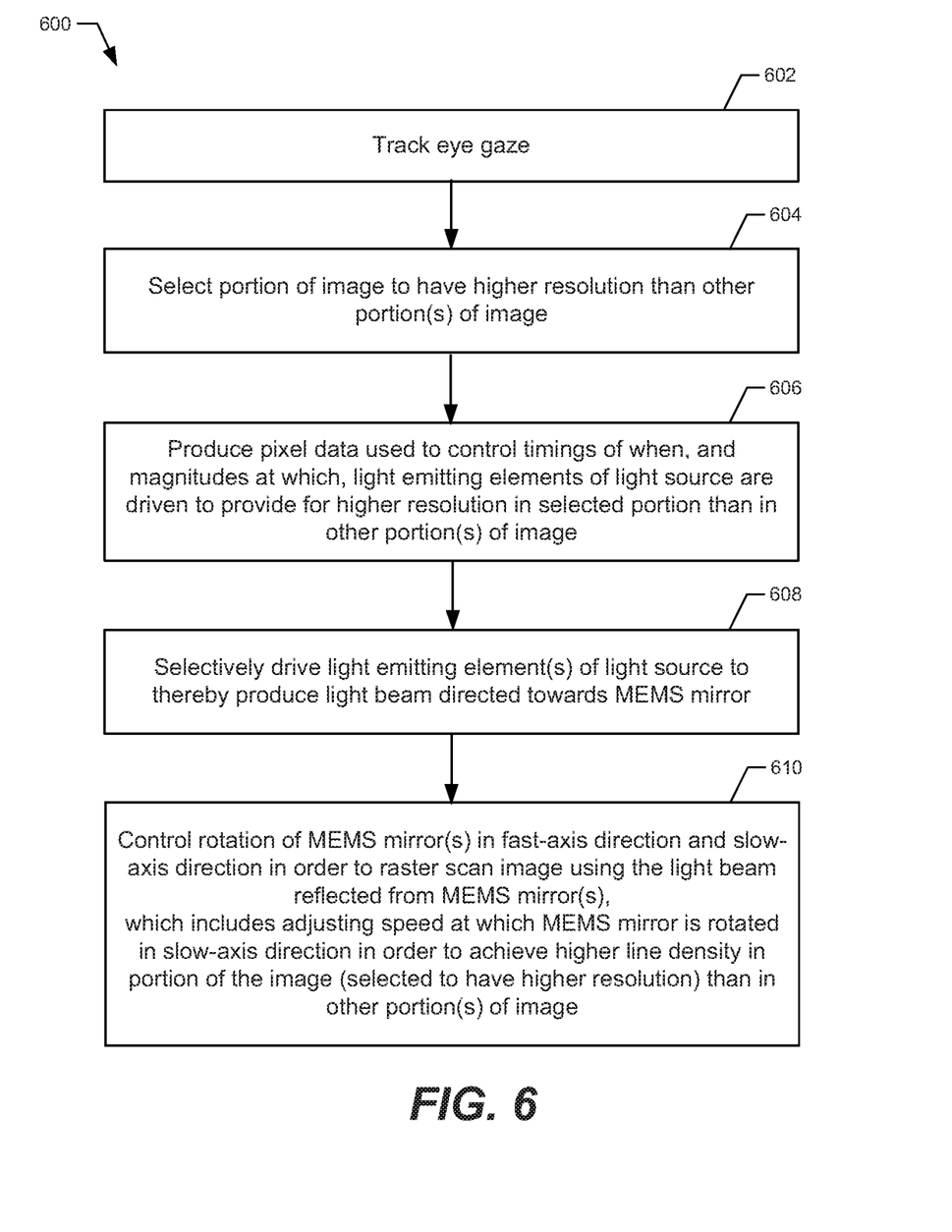
FIG. 6 is a high level flow diagram used to summarize methods according to various embodiments of the present technology which can be used to raster scan an image such that the image includes more than one line density.

The high level flow diagram of FIG. 6 will now be used to summarize methods 600 according to various embodiments of the present technology which can be used to raster scan an image such that the image includes more than one line density. Such a method can be used, e.g., to raster scan an image so that the image includes a greater line density in a foveal region than in a non-foveal region.

Referring to FIG. 6, step 602 involves tracking eye gaze of a user of a near eye display or a heads up display, but not limited thereto. Referring back to FIG. 5, the eye tracker 505, or some alternative type of eye tracker, can be used to perform step 602. Any known or future developed technique for tracking eye gaze can be used, as no specific technique for tracking eye gaze is required to implement the embodiments summarized with reference to FIG. 6.

Step 604 involves selecting a portion of an image that is to have a higher resolution that one or more other portions of the image. In accordance with certain embodiments, the portion of the image that is selected to have a higher resolution is based on the eye gaze location that is detected at step 602. For example, a portion of the image that is centered about the eye gaze location can be selected to have the higher resolution. In other embodiments, the portion of the image having the higher resolution can be a predetermined fixed location, e.g., within the center of the image. In still other embodiments, the portion of the image having the higher resolution can be a portion of interest, e.g., in order to direct a user's gaze toward the portion of interest. The portion of interest can move, or can be static. Other variations are also possible. Where eye gaze is not used to select the portion of the image that is to have the higher resolution at step 604, step 602 can be eliminated from the methods summarized with reference to FIG. 6 (although detected eye gaze can be used for other purposes, unrelated to the embodiments specifically described herein).

Still referring to FIG. 6, step 606 involves producing pixel data used to control timings of when, and magnitudes at which, light emitting elements of a light source are driven to provide for higher resolution of a specific (e.g., selected) portion of an image than in other portion(s) of the image. The magnitudes can be specified as amplitudes, pulse widths, or a combination thereof. Where a light source includes red, green and blue light emitting elements, the pixel data can include red, green and blue pixel data. Step 606 can be performed, e.g., by the image processor 104 shown in and described above with reference to FIG. 1. Step 606 can involve, inter alia, foveal rendering of an image, and more specifically, frames thereof. Step 608 involves selectively driving one or more light emitting element(s) of a light source, in dependence on the pixel data produced at step 606, to thereby produce a light beam that is directed towards a MEMS mirror that is used to raster scan the image. Depending upon implementation, a single biaxial MEMS mirror can be used for raster scanning, or two uniaxial MEMS mirrors can be used, as was explained above with reference to the mirror(s) 118 in FIG. 1.

Step 610 involves controlling rotation of the MEMS mirror(s) in a fast-axis direction and a slow-axis direction in order to raster scan an image using the light beam reflected from the MEMS mirror(s). In accordance with specific embodiments of the present technology, step 610 includes adjusting a speed at which a MEMS mirror is rotated in the slow-axis direction in order to achieve a first line density in a first portion of the image being raster scanned and to achieve a second line density, that is less than the first line density, in a second portion of the image being raster scanned. The first portion of the image can be the portion selected at step 604, discussed above. More specifically, the first portion of the image can include a foveal region of the image, and the second portion of the image can include a non-foveal region of the image. Examples of how step 610 can be performed were described above, e.g., with reference to FIGS. 3A, 3B and 4. More specifically, in accordance with certain embodiments, step 602 can be performed by generating one of the slow scan control waveforms 302 or 402 respectively shown in FIGS. 3A and 4.

Figure 4:
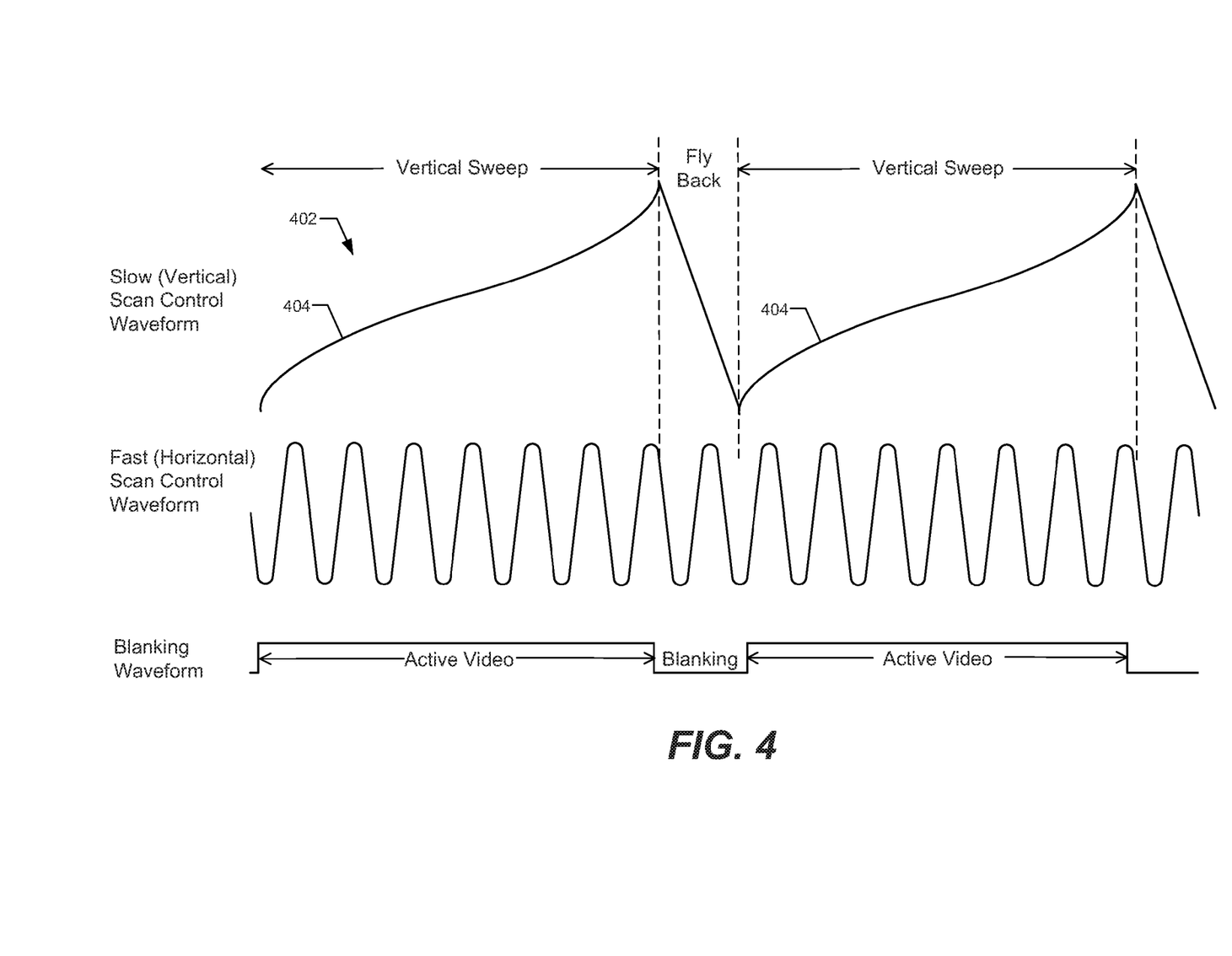
FIG. 4 shows slow and fast scan control waveforms, according to another embodiment of the present technology, wherein the slow scan control waveform has non-linear portions of varying slope.

Referring briefly back to FIGS. 3A and 4, the rising portions (corresponding to vertical sweeps from top-to-bottom) of the slow scan control waveforms 302 and 402 shown therein have more than one slope, which causes the slow (e.g., vertical) rotation of a scanning mirror to vary in speed during each slow (e.g., vertical) sweep that is used to raster scan an image, and more specifically, a frame thereof. As was shown in and discussed above with reference to FIG. 3A, the slow scan control waveform can be a piece-wise linear signal that has two (or more) different slopes, which causes raster scanning about the slow-axis to occur at two (or more) different speeds during each sweep about the slow-axis. Alternatively, rather than being a piece-wise linear signal that has two or more different slopes, portions of the slow scan control waveform can be a non-linear signal that causes raster scanning about the slow-axis to occur at numerous different speeds. For an example, each of the rising portions (corresponding to vertical sweeps from top-to-bottom) of the slow scan control waveform can be generally sinusoidal, as shown, for example, in FIG. 4 discussed above. It would also be possible that portions of the slow scan control (corresponding to vertical sweeps) can be a combination of a piece-wise linear signal and a generally sinusoidal signal. For example, referring back to FIG. 3A, the portions 304 of the waveform 302 can remain as shown in FIG. 3A, and the segments 305 can be generally sinusoidal, or vice versa. Other variations are also possible and within the embodiments described herein, as would be appreciated by one of ordinary skill in the art reading this description.

A human eye essentially integrates light that is incident on the eye when perceiving brightness. This is why a human eye cannot typically perceive the difference between pixels that have their brightness controlled by amplitude modulation, pixels that have their brightness controlled by pulse width modulation, and pixels that have their brightness controlled by a combination of amplitude and pulse width modulation. Because of the way that a human eye perceives brightness, if not correctly compensated for, a portion of an image that has a greater line density could be perceived to be significantly brighter than a portion of an image having a lower line density, which could adversely affect the overall image quality. For a simple example, assume an entire frame of an image is to have a same color (e.g., green) and same brightness. If the magnitude information included in the pixel data used to generate pixels in a portion of the image having a greater line density is the same as the magnitude information included in further pixel data used to generate pixels in a further portion of the image having a lower line density, then the portion of the image having the higher line density will appear brighter to an eye that is viewing the image. In accordance with certain embodiments of the present technology, the image data is produced in such a manner so as to compensate for this situation. For example, referring briefly back to FIG. 1, in accordance with certain embodiments, the image processor 104 produces pixel data to control the magnitudes at which the emitting elements 112 are driven to compensate for how brightnesses of portions of an image being raster scanned are affected by the scan controller 106 adjusting the speed at which a MEMS mirror 118 is rotated in the slow-axis direction. In other words, the image processor 104 produces pixel data to control the magnitudes at which the emitting elements 112 are driven to compensate for how brightnesses of portions of the image being raster scanned are effected by differences in line densities.

Still referring back to FIG. 1, in accordance certain embodiments, a control loop for slow scan (e.g., vertical) control timing uses a lookup table to correlate line number with mirror position. The look up table can be stored in memory or registers that are included within or otherwise accessible to the image processor 105. More specifically, the image processor 105 can use an algorithm to populate the look up table. The algorithm can be provided with a desired line rate in a foveal region, a desired line rate in a non-foveal region, a field of view, a position and size of the foveal region within the field of view, control loop bandwidth (BW) parameters (e.g., limits for first and second derivatives), and the algorithm can be used to generate a lookup table that results in the appropriate mirror response. Additionally, this look up table can be used to generate image sampling coordinates that are used to retrieve, filter, scale, and prepare a display pixel data that is provided by the image processor 105 to the LDD 108. The same, or a different, look up table and/or an algorithm can be used to implement features of the brightness compensation.

By increasing the line density in a portion of an image, the vertical resolution in that portion of the image is increased. As described above, such techniques can be used to increase vertical resolution in a portion of an image that a user is looking at, compared to a portion of an image that a user is not looking at.

Certain embodiments of the present technology can additionally or alternatively be used to vary horizontal resolution by only updating pixel data associated with a virtual pixel when new data is present, and otherwise maintaining the pixel data the same. In specific embodiments, when the scanning device 100 is generating pixel data that is to be used for scanning a non-foveal region of an image, the pixel data (e.g., generated by the image processor 104 and provided to the DACs 109 of the LDD 108) can be updated less frequently than when the pixel data is being generated for use in scanning a foveal region. This reduces power consumed to perform calculations used to determine the pixel data, clock power, and the like.

Note that the discussion above introduces many different features and many embodiments. It is to be understood that the above-described embodiments are not all mutually exclusive. That is, the features described above (even when described separately) can be combined in one or multiple embodiments.

For purposes of this document, it should be noted that the dimensions of the various features depicted in the figures may not necessarily be drawn to scale. For example, in FIGS. 3A and 4, in an actual implementation there would be many more inflections in each portion of the fast scan waveform corresponding to a vertical sweep. For another example, the relative magnitudes of the waveforms shown in FIGS. 3A and 4 are not necessarily drawn to scale.

For purposes of this document, reference in the specification to "an embodiment," "one embodiment," "some embodiments," or "another embodiment" may be used to describe different embodiments or the same embodiment.

For purposes of this document, the term "based on" may be read as "based at least in part on."

For purposes of this document, without additional context, use of numerical terms such as a "first" object or portion, a "second" object or portion, and a "third" object or portion may not imply an ordering of objects or portion, but may instead be used for identification purposes to identify different objects or portions.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
one or more MEMS mirrors;
a light source driver configured to selectively drive one or more light emitting elements of a light source to thereby produce a light beam that is directed towards a same MEMS mirror of the one or more MEMS mirrors; and
a controller configured to control rotation of the one or more MEMS mirrors in a fast-axis direction and a slow-axis direction in order to raster scan an image using the light beam reflected from the one or more MEMS mirrors;
wherein the controller is configured to dynamically adjust a speed at which one of the one or more MEMS mirrors is rotated in the slow-axis direction in order to achieve a first line density in a first portion of the image being raster scanned and to achieve a second line density, that is less than the first line density, in a second portion of the image being raster scanned.

2. The apparatus of claim 1, wherein:
the first portion of the image comprises a foveal region of the image; and
the second portion of the image comprises a non-foveal region of the image.

3. The apparatus of claim 1, wherein a location of the first portion of the image is fixed relative to a rest of the image.

4. The apparatus of claim 1, wherein a location of the first portion of the image is dynamic relative to a rest of the image.

5. The apparatus of claim 4, wherein the location of the first portion of the image is based on a gaze of an eye, and changes in response to the gaze changing.

6. The apparatus of claim 5, further comprising:
an eye tracker configured to determine the gaze of an eye;
wherein the controller is configured to determine the location of the first portion of the image based on the gaze of an eye as determined by the eye tracker.

7. The apparatus of claim 1, further comprising:
an image processor that is configured to produce pixel data that is provided to the light source driver and used by the light source driver to control timings of when, and magnitudes at which, the one or more light emitting elements of the light source are driven;
wherein the image processor produces the pixel data to control the magnitudes at which the one or more light emitting elements of the light source are driven to compensate for how brightnesses of portions of the image are affected by the controller adjusting the speed at which one of the one or more MEMS mirrors are rotated in the slow-axis direction.

8. The apparatus of claim 7, wherein the image processor is also configured to produce the pixel data to provide for higher rendered image resolution in the first portion of the image being raster scanned than in the second portion of the image being raster scanned.

9. A method, comprising:
selectively driving one or more light emitting elements of a light source to thereby produce a light beam that is directed towards a same MEMS mirror of one or more MEMS mirrors; and
controlling rotation of the one or more MEMS mirrors in a fast-axis direction and a slow-axis direction in order to raster scan an image using the light beam reflected from the one or more MEMS mirrors;
wherein the controlling includes adjusting a speed at which one of the one or more MEMS mirrors is rotated in the slow-axis direction in order to achieve a first line density in a first portion of the image being raster scanned and to achieve a second line density, that is less than the first line density, in a second portion of the image being raster scanned.

10. The method of claim 9, wherein:
the first portion of the image comprises a foveal region of the image; and the second portion of the image comprises a non-foveal region of the image.

11. The method of claim 9, wherein a location of the first portion of the image is fixed relative to a rest of the image.

12. The method of claim 9, wherein a location of the first portion of the image is dynamic relative to a rest of the image.

13. The method of claim 12, further comprising tracking a gaze of an eye, and determining the location of the first portion of the image based on the gaze.

14. The method of claim 9, wherein the controlling includes producing a slow scan control signal including portions, for use during vertical sweeps, that include two or more different slopes.

15. The method of claim 9, further comprising:
producing pixel data that is used to control timings of when, and magnitudes at which, the one or more light emitting elements of the light source are driven, such that the pixel data provides for higher image resolution in the first portion of the image being raster scanned than in the second portion of the image being raster scanned; and
wherein the producing the pixel data includes selecting the magnitudes at which the one or more light emitting elements of the light source are driven to compensate for how brightnesses of portions of the image are affected by adjustments to the speed at which one of the one or more MEMS mirrors are rotated in the slow-axis direction.

16. A near eye or heads up display system, comprising:
one or more MEMS mirrors;
a light source comprising one or more light emitting elements;
a light source driver configured to selectively drive the one or more light emitting elements of the light source to thereby produce a light beam that is directed towards a same MEMS mirror of the one or more MEMS mirrors;
a controller configured to control rotation of the one or more MEMS mirrors in a fast-axis direction and a slow-axis direction in order to raster scan an image using the light beam reflected from the one or more MEMS mirrors; and
one or more optical waveguides each of which includes an input-coupler and an output-coupler;
wherein light corresponding to the image that is raster scanned using the light beam reflected from the one or more MEMS mirrors, under the control of the controller, is coupled into the one or more optical waveguides via the input-coupler(s) of the one or more optical waveguide(s);
wherein the light corresponding to the image, that is coupled into the one or more optical waveguides via the input-coupler(s), travels at least in part by way of total internal reflection (TIR) from the input-coupler(s) to the output-coupler(s) of the one or more optical waveguides;
wherein the output-coupler(s) is/are configured to couple light corresponding to the image, that has traveled within the one or more optical waveguides from the input-coupler(s) to the output-coupler(s), out of the one or more optical waveguides; and
wherein the controller is configured to dynamically adjust a speed at which one of the one or more MEMS mirrors is rotated in the slow-axis direction in order to achieve a greater line density in a first portion of the image being raster scanned than in a second portion of the image being raster scanned.

17. The system of claim 16, wherein:
the first portion of the image comprises a foveal region of the image; and
the second portion of the image comprises a non-foveal region of the image.

18. The system of claim 16, further comprising:
an eye tracker configured to determine a gaze of an eye;
wherein a location of the first portion of the image is dynamic; and
wherein the controller is configured to determine the location of the first portion of the image based on the gaze of an eye as determined using the eye tracker.

19. The system of claim 16, further comprising:
an image processor that is configured to produce pixel data that is provided to the light source driver and used by the light source driver to control timings of when, and magnitudes at which, the one or more light emitting elements of the light source are driven;
wherein the image processor produces the pixel data to control the magnitudes at which the one or more light emitting elements of the light source are driven to compensate for how brightnesses of portions of the image are affected by the controller adjusting the speed at which one of the one or more MEMS mirrors are rotated in the slow-axis direction.

20. The system of claim 19, wherein the image processor is also configured perform foveal rendering to provide for a higher rendered image resolution in the first portion of the image being raster scanned than in the second portion of the image being raster scanned.

* * * * *